United States Patent
Moorman et al.

(10) Patent No.: US 11,085,532 B2
(45) Date of Patent: Aug. 10, 2021

(54) METHOD FOR CONTROLLING A HYDRAULIC SYSTEM

(71) Applicant: GM GLOBAL TECHNOLOGY OPERATIONS LLC, Detroit, MI (US)

(72) Inventors: Steven P. Moorman, Dexter, MI (US); Christopher J. Weingartz, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 335 days.

(21) Appl. No.: 16/299,633

(22) Filed: Mar. 12, 2019

(65) Prior Publication Data
US 2020/0292071 A1   Sep. 17, 2020

(51) Int. Cl.
*F15B 11/00* (2006.01)
*F16H 61/30* (2006.01)
*F15B 13/02* (2006.01)

(52) U.S. Cl.
CPC ............ *F16H 61/30* (2013.01); *F15B 11/003* (2013.01); *F15B 13/024* (2013.01); *F15B 13/025* (2013.01); F15B 2211/20515 (2013.01); F15B 2211/20523 (2013.01); F15B 2211/31576 (2013.01); F15B 2211/327 (2013.01)

(58) Field of Classification Search
CPC . G05B 19/43; G05B 19/46; F15B 2211/6656; F15B 2211/6313; F15B 2211/6653
See application file for complete search history.

(56) References Cited

U.S. PATENT DOCUMENTS

| | | | | |
|---|---|---|---|---|
| 4,813,339 A * | 3/1989 | Uno | .................... | F15B 11/0426 318/599 |
| 5,030,847 A * | 7/1991 | Gotoh | .................. | H03K 17/663 327/176 |
| 5,207,239 A * | 5/1993 | Schwitalla | ......... | B60G 17/0195 251/129.09 |
| 7,210,394 B2 * | 5/2007 | Yajima | .................. | F15B 11/042 60/368 |
| 7,870,817 B2 * | 1/2011 | Kawabuchi | ............. | F15B 11/06 91/6 |
| 8,290,631 B2 * | 10/2012 | Sweeney | ............... | F15B 19/005 700/282 |
| 8,375,842 B2 * | 2/2013 | Kolbenschlag | ......... | F15B 11/08 91/361 |
| 2008/0196989 A1 * | 8/2008 | Petzold | .................... | F16D 48/04 192/31 |
| 2012/0204549 A1 * | 8/2012 | Gehlhoff | .................... | B66F 9/22 60/327 |
| 2018/0180066 A1 * | 6/2018 | Rygaard Hansen | ........................ | F15B 13/0417 |

FOREIGN PATENT DOCUMENTS

DE         10120113 A1 * 10/2002         ............ F15B 11/044

* cited by examiner

Primary Examiner — Thomas E Lazo

(57) ABSTRACT

A hydraulic system may include an electrohydraulic control valve disposed in fluid communication between a source of pressured fluid and a hydraulic actuator. The hydraulic system may be controlled to correct for offset errors between a target actuator pressure and a current actuator pressure output from the control valve, without amplifying pressure oscillations in the fluid between the control valve and the hydraulic actuator.

16 Claims, 3 Drawing Sheets

METHOD FOR CONTROLLING A HYDRAULIC SYSTEM

INTRODUCTION

Closed loop control systems, also referred to as feedback control systems, are oftentimes used to monitor, control, and adjust process variables (e.g., temperature, pressure, and/or velocity) so that the actual value of the variable is the same as a desired value or set point for the variable. To accomplish this, a sensor is used to monitor the actual value of the variable and to feed a signal representative thereof back to a comparator, which calculates the difference between the actual and desired value of the variable and outputs the difference as an error signal. Then, the error signal is supplied to a controller that determines and makes any necessary corrections to the process (e.g., by adjusting the operation of one or more actuators) to bring the actual value of the variable in line with the set point. In hydraulic systems, the controller may control or adjust the flow rate and/or pressure of fluid within the system by sending a signal to a control valve that controls the opening or closing of the control valve.

Pressure oscillations or pulses in hydraulic systems may occur, for example, due to changes in the quantity of fluid supplied by a pump, actuation of a control valve, or as a result of load fluctuations in hydraulic cylinders or motors. In addition, pressure oscillations may occur in hydraulic systems that are designed to allow for fast reaction times due to reduced damping of the systems. In some hydraulic systems, these pressure oscillations may settle out over time without making any adjustments to the actuators. Therefore, it may be desirable in such systems to employ a closed loop control method that can adjust for differences between a desired pressure and an actual pressure sensed within the system without adjusting for pressure differences that may initially occur between the desired and actual pressure due to pressure oscillations.

SUMMARY

In a method of controlling a hydraulic system, an electric pressure command signal may be received that represents an increase in a target actuator pressure to output from an electrohydraulic control valve disposed in fluid communication between a source of pressured fluid and a hydraulic actuator. The control valve may be opened in response to the pressure command signal to provide a flow of pressurized fluid from the source of pressurized fluid to the hydraulic actuator. The flow of pressurized fluid may generate pressure oscillations in the fluid between the control valve and the hydraulic actuator. A current actuator pressure representative of the pressure of the fluid between the control valve and the hydraulic actuator may be sensed on multiple occasions. The pressure difference between the target actuator pressure and the current actuator pressure may be calculated on multiple occasions as a function of time. An adjustment factor may be based at least in part upon (i) the calculated pressure difference between the target actuator pressure and the current actuator pressure and, (ii) the rate of change in the pressure difference between the target actuator pressure and the current actuator pressure as a function of time, and (iii) the sum of the pressure difference between the target actuator pressure and the current actuator pressure over time. The adjustment factor may be applied to the pressure command signal to obtain an adjusted pressure command signal. The adjusted pressure command signal may be applied to the control valve to correct for an offset error between the target actuator pressure and the current actuator pressure.

In one form, the adjusted pressure command signal applied to the control valve may not amplify the pressure oscillations generated in the fluid between the control valve and the hydraulic actuator.

The pressure difference between the target actuator pressure and the current actuator pressure may be calculated as a function of time to produce a raw error signal consisting of a series of raw error values, a mean error value may be calculated from the series of raw error values, and the adjustment factor may be generated from the mean error value. In such case, the adjustment factor may be generated by applying a control algorithm to the calculated mean error value. The control algorithm may include at least one of a proportional, integral, or derivative term.

The series of raw error values may be stored in a memory as a function of time. The mean error value may be calculated by sequentially evaluating the raw error values in the series of raw error values to identify a peak error value and an adjacent valley error value. The mean error value may be calculated by summing the peak error value and the adjacent valley error value to obtain an error value sum and then dividing the error value sum by two.

The peak error value and the adjacent valley error value may be identified by calculating a first derivative with respect to time of the raw error values to produce a series of differentiated error values. Each of the differentiated error values may be compared to a previous differentiated error value in the same series to identify (i) a first pair of adjacent first and second differentiated error values of opposite sign, wherein the first differentiated error value of the first pair is a positive value, and (ii) a second pair of adjacent third and fourth differentiated error values of opposite sign, wherein the third differentiated error value of the second pair is a negative value. A first raw error value in the series of raw error values may be identified that corresponds to the first differentiated error value and the first raw error value may be stored as the peak error value. A second raw error value in the series of raw error values may be identified that corresponds to the third differentiated error value and the second raw error value may be stored as the valley error value.

The series of raw error values may follow a wave pattern that includes a succession of peaks and valleys. In such case, the adjustment factor may be generated without the series of raw error values having completed a full cycle of the wave pattern.

The electric pressure command signal may be generated in response to input signals received by an electronic control unit of a vehicle.

An electrohydraulic actuation system may comprise a hydraulic subsystem, a pressure sensor, a target pressure module, an error module, and an adjustment module. The hydraulic subsystem may include an electrohydraulic control valve disposed in fluid communication between a source of pressured fluid and a hydraulic actuator. The control valve may control a flow and pressure of fluid between the source of pressured fluid and the hydraulic actuator. The pressure sensor may sense a current actuator pressure representative of the pressure of the fluid between the control valve and the hydraulic actuator. The target pressure module may determine a target actuator pressure to output from the control valve. The error module may receive a current actuator pressure signal from the pressure sensor representative of the sensed current actuator pressure as a function of time and a target actuator pressure signal from the target pressure module representative of the target actuator pressure determined by the target pressure module. The error module may calculate an adjustment factor based at least in part upon (i) a calculated pressure difference between the target actuator pressure and the current actuator pressure, (ii) a calculated rate of change in the pressure difference between the target actuator pressure and the current actuator pressure as a function of time, and (iii) a sum of the pressure difference between the target actuator pressure and the current actuator pressure over time. The adjustment module may apply the adjustment factor to the target actuator pressure to generate an adjusted target actuator pressure to output from the control valve. The adjusted target actuator pressure may correct for offset errors between the target actuator pressure and the current actuator pressure, without amplifying pressure oscillations generated in the fluid between the electrohydraulic control valve and the hydraulic actuator.

The electrohydraulic actuation system may comprise a valve control module that controls opening of the control valve based upon the adjusted target actuator pressure.

The electrohydraulic actuation system may comprise a solenoid in fluid communication with the control valve. In such case, the valve control module may control opening of the control valve by generating an electric pressure command signal and applying the electric pressure command signal to the solenoid.

The electric pressure command signal may move the control valve toward an open position. A biasing member may bias the control valve toward a closed position.

The source of pressured fluid may comprise a pump in fluid communication with a sump. The pump may be mechanically driven by an internal combustion engine or an electric motor.

The hydraulic actuator may comprise a component of an automated manual transmission, dual clutch transmission, continuously variable transmission, automatic transmission, manual transmission, or torque converter.

The error module may calculate the pressure difference between the current actuator pressure and the target actuator pressure on multiple occasions as a function of time to produce a series of raw error values, sequentially evaluate the raw error values to identify a peak error value and an adjacent valley error value in the series of raw error values, calculate a mean error value from the peak error value and the adjacent valley error value, and generate the adjustment factor from the mean error value.

The adjustment factor may be generated by applying a control algorithm to the calculated mean error value. The control algorithm may include at least one of a proportional, integral, or derivative term.

BRIEF DESCRIPTION OF THE DRAWINGS

Illustrative embodiments will hereinafter be described in conjunction with the appended drawings, wherein like designations denote like elements, and wherein.

DETAILED DESCRIPTION

The method described herein can be used to provide closed loop control of a hydraulic system that includes an electrohydraulic control valve disposed in fluid communication between a source of pressured fluid and a hydraulic actuator, wherein pressure oscillations may frequently occur in the hydraulic fluid between the control valve and the hydraulic actuator. In particular, the method described herein can be used to control the pressure of the hydraulic fluid between the control valve and the hydraulic actuator (the actuator pressure) by rapidly and effectively correcting for offset errors between a target actuator pressure and a current actuator pressure, without amplifying pressure oscillations in the hydraulic fluid. The effective and rapid correction of such offset errors is accomplished by removing the magnitude of the pressure oscillations from the raw error signal to obtain a mean error value, and then applying a control algorithm including at least one of a proportional, integral, or derivative term to the mean error value.

Figure 1:
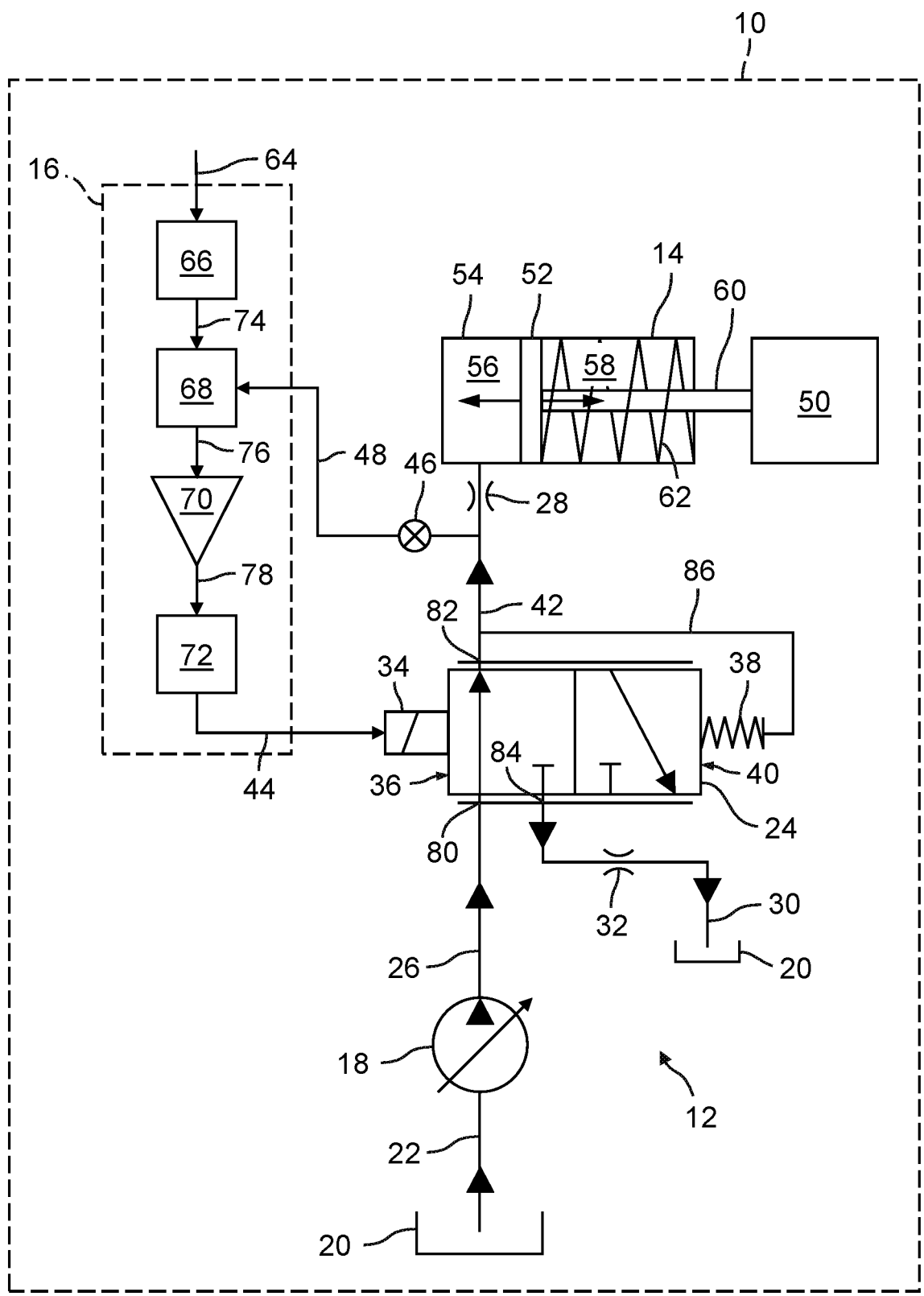
FIG. 1 is a schematic diagram of an electrohydraulic actuation system including an electronic control unit, a hydraulic subsystem, and a hydraulic actuator.

FIG. 1 depicts an electrohydraulic actuation system 10 including a hydraulic subsystem 12, a hydraulic actuator 14, an electronic control unit (ECU) 16, and a pressure sensor 46, in accordance with one or more embodiments of the present disclosure. Details of the presently disclosed closed loop control method will be described herein in connection with the electrohydraulic actuation system 10 show in FIG. 1. Ordinarily skilled artisans will appreciate that such control method can be implemented and/or incorporated into a variety of different electrohydraulic actuation systems.

The hydraulic subsystem 12 is operable to provide and regulate a flow and pressure of hydraulic fluid from a source of pressurized hydraulic fluid to the hydraulic actuator 14 in response to electric command signals produced by and received from the electronic control unit 16. The hydraulic subsystem 12 may include a hydraulic pump 18 that draws hydraulic fluid from a sump 20 via a fluid line 22 and outputs pressurized hydraulic fluid to an electrohydraulic control valve 24 via a supply line 26. Excess hydraulic fluid may be exhausted from the control valve 24 through a return line 30 to the sump 20 and optionally through a first flow restriction orifice 32. The pump 18 may be mechanically driven by an internal combustion engine or an electric motor (not shown).

The electrohydraulic control valve 24 controls the flow and pressure of fluid between the pump 18 and the hydraulic actuator 14. In one form, the control valve 24 may be an electrohydraulic proportional pressure control valve including a valve spool (not shown) disposed in a valve body (not shown), a control solenoid 34 disposed on a first end 36 of the valve spool, a biasing member 38 disposed on an opposite second end 40 of the valve spool, an inlet port 80 in fluid communication with the hydraulic pump 18 via the supply line 26, an outlet port 82 in fluid communication with the hydraulic actuator 14 via a feed line 42, and an exhaust port 84 in fluid communication with the sump 20 via return line 30. A pilot passage 86 may provide fluid communication between the outlet port 82 of the control valve 24 and a chamber (not shown) disposed on the second end 40 of the valve spool.

The position of the control valve 24 may be modulated by the control solenoid 34, the biasing member 38, and the pressure of the fluid supplied via the pilot passage 86 to the chamber disposed on the second end 40 of the valve spool. The control solenoid 34 acts on the first end 36 of the valve spool while the biasing member 38 and the fluid in the pilot passage 86 act on the second end 40 of the valve spool until a pressure balance is achieved between a command pressure exerted on the first end 36 of the valve spool by the solenoid 34 and the pressure exerted on the second end 40 of the valve spool by the biasing member 38 and the fluid in the pilot passage 86. The biasing member 38 biases the control valve 24 in a closed position and maintains the valve 24 in the closed position when the control solenoid 34 is deenergized. In the closed position, hydraulic fluid is prevented from flowing through the control valve 24 from the pump 18 to the actuator 14 via the feed line 42. In the closed position, hydraulic fluid may be exhausted from the actuator 14 and allowed to flow from the actuator 14, through the control valve 24, through the return line 30, to the sump 20.

When it is desirable to increase the flow and pressure of hydraulic fluid supplied to the hydraulic actuator 14, the control solenoid 34 is energized, for example, by receiving an electric pressure command signal 44 from the ECU 16. In response to the electric pressure command signal 44, the solenoid 34 acts on the control valve 24 to move the control valve 24 to an open position. In the open position, pressurized hydraulic fluid is allowed to flow from the pump 18, through the control valve 24, and to the actuator 14 via the feed line 42 and optionally through a second flow restriction orifice 28. This increases the pressure in the feed line 42. As the pressure increases in the feed line 42, the pilot passage 86 allows some of the pressurized fluid to flow from the outlet port 82 of the control valve 24, through the pilot passage 86, to the second end 40 of the valve spool. The fluid pressure exerted on the second end 40 of the valve spool along with the pressure exerted by the biasing member 38 moves the control valve 24 toward the closed position and at least partially cuts off the flow of pressurized fluid from the outlet port 82 of the control valve 24 until a pressure balance is achieved between the force exerted on the first and second ends 36, 40 of the control valve 24. The force exerted on the control valve 24 by the solenoid 34 can be increased or decreased to control the degree of opening of the control valve 24 by increasing or decreasing the electric pressure command signal 44 applied to the solenoid 34.

The pressure sensor 46 is disposed in fluid communication between the control valve 24 and the actuator 14 (e.g., on feed line 42) and is operable to sense or measure the current actuator pressure of the hydraulic fluid output from the control valve 24 and supplied to the actuator 14 via the feed line 42. The pressure sensor 46 may be operable to sense the current actuator pressure on multiple occasions as a function of time. For example, the pressure sensor 46 may be operable to sense the current actuator pressure on a continuous, intermittent, or periodic basis. Based upon the sensed current actuator pressure, the pressure sensor 46 generates a current actuator pressure signal 48 representative of the sensed current actuator pressure and supplies the current actuator pressure signal 48 to the ECU 16, e.g., as part of an electronic control feedback loop.

The hydraulic subsystem 12 depicted in FIG. 1 is one example of a hydraulic system that can be included in the presently disclosed electrohydraulic actuation system 10. It will be appreciated that, in other embodiments, the arrangement and number of hydraulic fluid lines, hydraulic valves, and/or other hydraulic elements in the hydraulic subsystem 12 may be different. For example, there may be a valve that allows hydraulic fluid to be exhausted from the actuator 14 to the sump 20 via a separate fluid line, instead of feed line 42, so that hydraulic fluid does not flow in a reverse direction to the pump 18. In FIG. 1, the control valve 24 is in direct fluid communication with the pump 18 via the supply line 26 and also is in direct fluid communication with the hydraulic actuator 14 via the feed line 42. However, in other embodiments, the control valve 24 may be in indirect fluid communication with the pump 18 and/or the actuator 14, for example, and may be spaced apart therefrom via one or more additional hydraulic valves, which may allow hydraulic fluid to be distributed by the pump 18 to one or more additional hydraulic actuators. Some examples of additional hydraulic elements that optionally may be included in the hydraulic system 12 include accumulators, check valves, pressure relief valves, and/or pressure-reducing valves.

The hydraulic actuator 14 is mechanically coupled to a load 50 and is operable to apply a force to the load 50 in response to a supply of pressurized hydraulic fluid from the sump 20 via the pump 18 and the control valve 24. The hydraulic actuator 14 comprises a piston 52 reciprocally disposed within a cylinder 54 that divides the cylinder 54 into a first chamber 56 on a first side of the piston 52 and a second chamber 58 on a second opposite side of the piston 52. The piston 52 is connected to a piston rod 60 that extends through the second chamber 58 of the cylinder 54 and is coupled to the load 50 at a distal end thereof. The hydraulic actuator 14 shown in FIG. 1 comprises a single-acting cylinder 54 having a biasing member 62 located within the second chamber 58 of the cylinder 54. As such, the position of the piston 52 within the cylinder 54 is controlled by controlling the pressure of hydraulic fluid supplied to the first chamber 56 of the cylinder 54. The pressure of hydraulic fluid in the first chamber 56 acts on the first side of the piston 52, while the biasing member 62 acts on the second side of the piston 52 until a pressure balance is achieved between the force exerted on the first side of the piston 52 by the pressurized hydraulic fluid in the first chamber 56 and the force exerted on the second side of the piston 52 by the biasing member 62 in the second chamber 58. In other embodiments, the hydraulic actuator 14 may comprise a double-acting cylinder (not shown), and the position of the piston 52 within the cylinder 54 may be controlled by balancing the pressure of hydraulic fluid respectively supplied to the first and second chambers 56, 58 of the cylinder 54. In practice, the hydraulic actuator 14 and/or the load 50 may comprise a component of an automotive vehicle. For example, the hydraulic actuator 14 and/or the load 50 may comprise a component of an automated manual transmission, dual clutch transmission, continuously variable transmission, automatic transmission, manual transmission, or torque converter, e.g., a pulley, clutch, brake, or band. In one specific example, the hydraulic actuator 14 and/or the load 50 may comprise a component of a primary or secondary pulley of a continuously variable transmission.

The ECU 16 controls the position of the control valve 24 and thereby the flow of pressurized hydraulic fluid through the control valve 24 in response to the current actuator pressure signal 48 received from the pressure sensor 46 and in response to one or more input signals 64 received from various sensors and/or other data sources. For example, the ECU 16 may control the position of the control valve 24 in response to input signals 64 received from a line pressure sensor (not shown) disposed in fluid communication between the pump 18 and the control valve 24 (e.g., on supply line 26). In embodiments where the electrohydraulic actuation system 10 comprises a component of a vehicle, the ECU 16 may comprise part of a transmission control module (TCM) and/or an engine control module (ECM) including a microprocessor and a memory. In such case, the ECU 16 may receive input signals 64 related to one or more components of the vehicle transmission, engine, and/or powertrain. For example, the ECU 16 may control the position of the control valve 24 and thereby the flow of pressurized hydraulic fluid through the control valve 24 in response input signals 64 representative of the engine speed, engine load, and/or accelerator pedal position of the vehicle. In one form, the input signals 64 received by the ECU 16 may be used to calculate a target drive ratio between the rotational speed of a transmission input shaft and the rotational speed of a transmission output shaft, and wherein the control the position of the control valve 24 may be based upon the calculated target drive ratio.

The ECU 16 may comprise a target pressure module 66, an error module 68, an adjustment module 70, and a valve control module 72. The target pressure module 66 determines a target actuator pressure to output from the control valve 24 to produce a desired pressure in the first chamber 56 of the of the cylinder 54 (and a desired force exerted on the first side of the piston 52) to achieve a desired response by the hydraulic actuator 14. The target actuator pressure produced by the target pressure module 66 may be based upon the input signals 64 and may be determined, for example, using one or more look up tables or functions that relate the input signals 64 to the target actuator pressure. Then, the target pressure module 66 outputs a target actuator pressure signal 74 representative of the target actuator pressure to output from the control valve 24.

The error module 68 calculates an adjustment factor that can be used to correct for offset errors between the desired target actuator pressure and the current actuator pressure output from the control valve 24, without amplifying pressure oscillations in the fluid between the control valve 24 and the hydraulic actuator 14. It may be desirable to correct for such offset errors, for example, to ensure an accurate response by the hydraulic actuator 14. The error module 68 generates an adjustment factor signal 76 representative of the calculated adjustment factor and outputs the adjustment factor signal 76 to the adjustment module 70.

The adjustment module 70 applies the adjustment factor to the target actuator pressure calculated by the target pressure module 66 and generates an adjusted target actuator pressure to output from the control valve 24 to achieve substantial correspondence between the target actuator pressure and the current actuator pressure output from the control valve 24. In one form, substantial correspondence between the target actuator pressure and the current actuator pressure output from the control valve 24 may be achieved when the difference between the current actuator pressure and the target actuator pressure is less than a predetermined amount, e.g., less than 5% of the target actuator pressure. The adjustment module 70 outputs an adjusted target actuator pressure signal 78 representative of the adjusted target actuator pressure and delivers the adjusted target actuator pressure signal 78 to the valve control module 72.

The valve control module 72 generates an electric pressure command signal 44 based upon the adjusted target actuator pressure signal 78 and outputs the electric pressure command signal 44 to the solenoid 34 to control opening of the control valve 24. The electric pressure command signal 44 applied to the solenoid 34 controls and/or adjusts the pressure and flow of hydraulic fluid output from the control valve 24 so that the pressure of the hydraulic fluid between the control valve 24 and the actuator 14 approaches the adjusted target actuator pressure and the desired response by the hydraulic actuator 14 is achieved.

Pressure oscillations may be generated in the hydraulic fluid between the control valve 24 and the hydraulic actuator 14 during normal operation of the electrohydraulic actuation system 10. For example, pressure oscillations may be generated in the hydraulic fluid between the control valve 24 and the hydraulic actuator 14 upon an increase (or decrease) in the strength of the electric pressure command signal 44 applied to the solenoid 34. A change in the strength of the electric pressure command signal 44 applied to the solenoid 34 may occur, for example, in response to a change in the input signals 64 received by the ECU 16, which may necessitate an increase or decrease in the pressure of the hydraulic fluid between the control valve 24 and the hydraulic actuator 14. Without intending to be bound by theory, it is believed that such pressure oscillations may result from the underdamped nature of the hydraulic subsystem 12 and may eventually settle out of the system over time. In addition, it is believed that, due to an inherent delay between the timing of the electric pressure command signal 44 generated the ECU 16, the movement of the control valve 24 in response to the command signal 44, and the change in pressure between the control valve 24 and the hydraulic actuator 14 in response to the movement of the control valve 24, any attempt to correct for such pressure oscillations may have the undesirable effect of amplifying the oscillations and/or may thwart the natural tendency for the pressure oscillations to settle out of the system over time.

The error module 68 is configured to correct for offset errors between the desired target actuator pressure and the current actuator pressure output from the control valve 24, without amplifying pressure oscillations that may be occurring in the fluid between the control valve 24 and the hydraulic actuator 14. In particular, the error module 68 is configured to receive a current actuator pressure signal 48 from the pressure sensor 46 and a target actuator pressure signal 74 from the target pressure module 66 and to output an adjustment factor signal 76 that can be used to control or adjust the strength of the electric pressure command signal 44 applied to the solenoid 34 so that the current actuator pressure output from the control valve 24 approaches the target actuator pressure.

Figure 2:
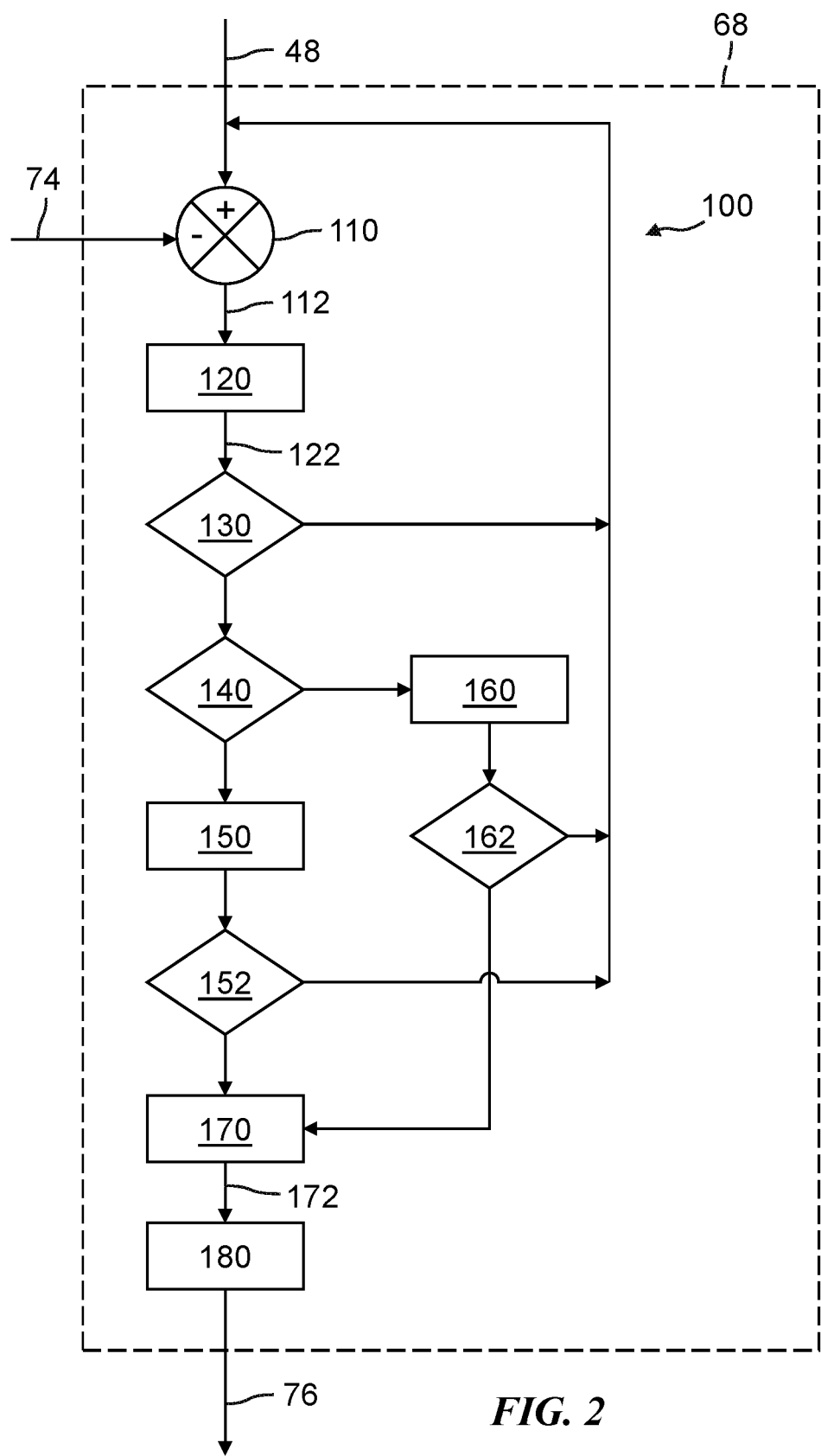
FIG. 2 is a functional block diagram of a closed loop control method implemented within the electronic control unit of FIG. 1 to correct for offset errors between a target actuator pressure and a current actuator pressure.
Figure 3:
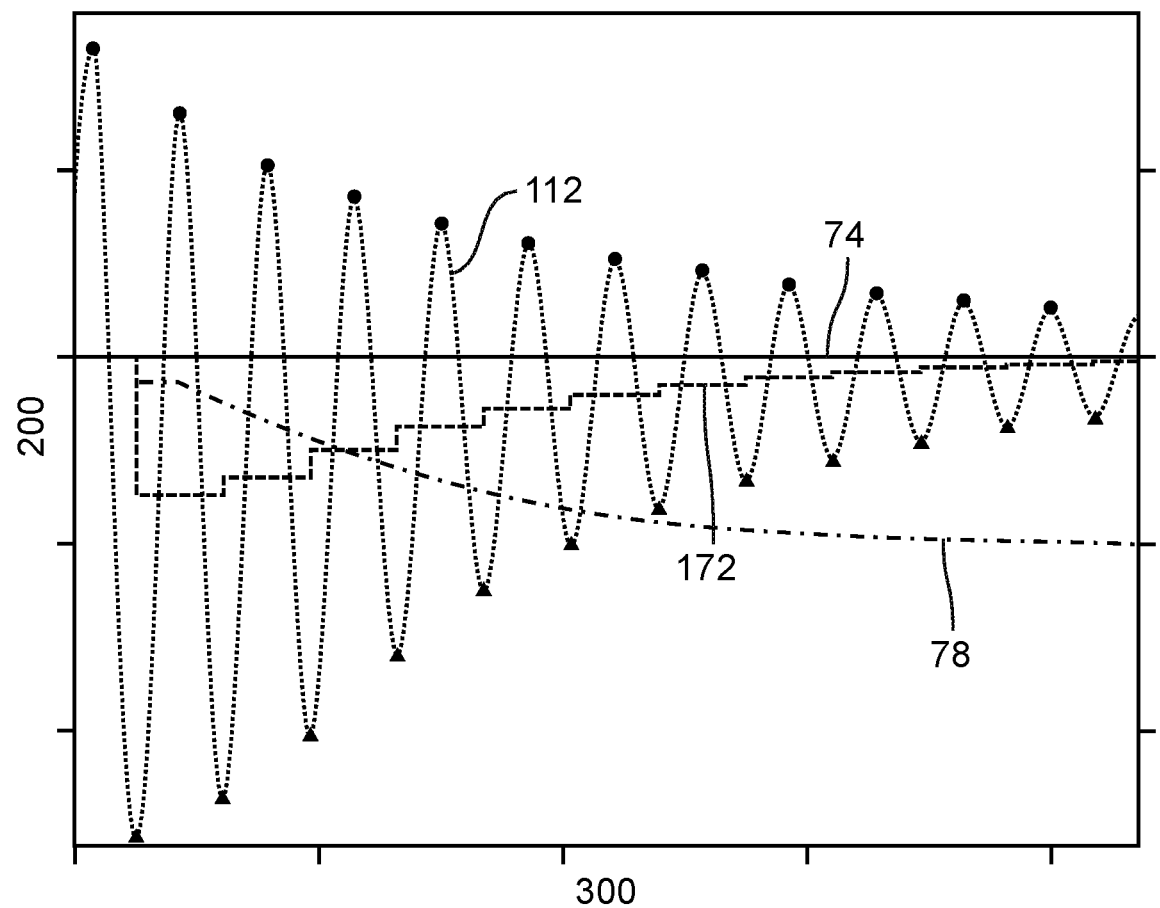
FIG. 3 is a graph of pressure (200) vs. time (300) depicting a target actuator pressure signal (74), a raw error pressure signal (112), a mean error value signal (172), and an adjusted target actuator pressure signal (78).

FIG. 2 depicts a functional block diagram of a closed loop control method 100 used by the error module 68 to generate the adjustment factor (and the corresponding adjustment factor signal 76) based upon the current actuator pressure signal 48 received from the pressure sensor 46 (representative of the current actuator pressure $P_c$ output from the control valve 24) and the target actuator pressure signal 74 received from the target pressure module 66 (representative of the target actuator pressure $P_t$ to output from the control valve 24 to produce a desired result). In block 110, the error module 68 receives the current actuator pressure signal 48 from the pressure sensor 46 and the target actuator pressure signal 74 from the target pressure module 66 and calculates the pressure difference $(P_t-P_c)$ therebetween on multiple occasions as a function of time (t) to produce a raw error signal 112 consisting of a series of raw error values, e(t). The series of raw error values may be stored in a memory device (not shown), for example, of the ECU 16. When pressure oscillations are occurring in the hydraulic fluid between the control valve 24 and the hydraulic actuator 14, the current actuator pressure signal 48 output from the pressure sensor 46 may follow a damped oscillatory wave pattern. In such case, the raw error signal 112 produced in block 110 of the error module 68 will also follow a damped oscillatory wave pattern that includes a succession of peaks and valleys, as shown in FIG. 3.

In block 120, the error module 68 calculates the first derivative with respect to time of the raw error values (i.e., the rate of change in the raw error values as a function of time) to produce a differentiated error signal 122 consisting of a series of differentiated error values, de(t)/dt. The series of differentiated error values may be stored in the memory device as a function of time. In blocks 130, 140, 150, and 160, the error module 68 sequentially evaluates the differentiated error values to identify a peak error value, $e_{peak}$, and an adjacent valley error value, $e_{valley}$ in the series of raw error values. A peak error value occurs when the amplitude of the pressure oscillations in the fluid between the control valve 24 and the actuator 14 reaches a maximum value and the error or difference between the target actuator pressure and the current actuator pressure likewise reaches a maximum value. A valley error value occurs when the amplitude of the pressure oscillations in the fluid between the control valve 24 and the actuator 14 reaches a minimum value and the error or difference between the target actuator pressure and the current actuator pressure likewise reaches a minimum value. Peak error values are identified by circles (●) and valley error values are identified by triangles (▲) in FIG. 3.

In block 130, each differentiated error value is compared to a previous differentiated error value in the series of differentiated error values until a first pair of adjacent first and second differentiated error values of opposite sign (i.e., a positive differentiated error value adjacent to a negative differentiated error value) are identified. If no such pair is identified, for example, if each successive differentiated error value is found to be of the same sign (i.e., both positive or both negative), then the method loops back to block 110.

Identification of a pair of adjacent differentiated error values of opposite sign indicates that the damped oscillatory wave pattern followed by the raw error signal 112 has either reached a peak or a valley. In block 140, it is determined whether the first differentiated error value of the first pair is a positive value or a negative value. If the first differentiated error value of the first pair is a positive value, then it is determined that the series of error values has reached a peak and the method proceeds to block 150. If the first differentiated error value of the first pair is a negative value, then it is determined that the series of error values has reached a valley and the method proceeds to block 160.

When it is determined that the first differentiated error value of the first pair is a positive value, in block 150, the error value corresponding to the first differentiated error value of the first pair is identified, for example, by reference to the error values stored in memory. Then, the corresponding error value is stored in memory as a first peak error value. After identification of the first peak error value, in block 152, it is determined whether a first valley error value has already been identified. If a first valley error value has already been identified, then the method proceeds to block 170. If a first valley error value has not yet been identified, then the method loops back to block 110.

When it is determined that the first differentiated error value of the first pair is a negative value, in block 160, the error value corresponding to the first differentiated error value of the first pair is identified, for example, by reference to the raw error values stored in memory. Then, the corresponding raw error value is stored in memory as a first valley error value. After identification of the first valley error value, in block 162, it is determined whether a first peak error value has already been identified. If a first peak error value has already been identified, then the method proceeds to block 170. If a first peak error value has not yet been identified, then the method loops back to block 110.

After both a peak error value and an adjacent valley error value have been identified and stored in memory, the method proceeds to block 170. In block 170, a mean error value is calculated from the peak error value and the adjacent valley error value, i.e., by summing the peak error value and the adjacent valley error value and then dividing by two. A mean error value signal 172 representative of the calculated mean error value is then supplied to block 180.

In block 180, the error module 68 calculates the adjustment factor and outputs an adjustment factor signal 76 representative of the calculated adjustment factor to the adjustment module 70. The adjustment factor is calculated in block 180 by applying a control algorithm to the calculated mean error value. The control algorithm applied to the calculated mean error value includes at least one of a proportional (P), integral (I), or derivative (D) term.

In one form, the adjustment factor is calculated in block 180 by applying a control algorithm to the calculated mean error value that includes a proportional term and an integral term. The most recently calculated adjustment factor may be stored in the memory of the ECU 16.

Because only one peak error value and an adjacent valley error value pair are needed to calculate the adjustment factor, the damped oscillatory wave pattern followed by the series of error values need not have completed a full wave cycle in order for the error module 68 to calculate the adjustment factor. In other words, the adjustment factor may be generated by the error module 68 without the series of error values having completed a full wave cycle of its damped oscillatory wave pattern. A full wave cycle of a damped oscillatory wave occurs when the wave has traveled one complete wavelength, e.g., when the wave has passed through two peaks (crests), two valleys (troughs), or two inflection points (points where the wave crosses its tangent). As such, the adjustment factor may be generated by the error module 68 without the series of raw error values having passed through two peaks, two valleys, or two inflection points.

When pressure oscillations are not occurring in the hydraulic fluid between the control valve 24 and the hydraulic actuator 14, the error module 68 will not be able to identify a peak error value and an adjacent valley error value in the series of raw error values and the method implemented by the error module 68 will continually loop back to block 110 without outputting a mean error value to block 180. In such case, in one form, the adjustment module 70 may continue to apply the most recent previously calculated adjustment factor to the target actuator pressure to generate an adjusted target actuator pressure to output from the control valve 24. In another form, where there are no previously calculated adjustment factors stored in memory, the error module 68 may calculate an initial adjustment factor based upon one or more raw error values calculated as the difference between the current actuator pressure and the target actuator pressure on one or more occasions.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:
1. A method of controlling a hydraulic system, the method comprising:
    receiving an electric pressure command signal representing an increase in a target actuator pressure to output from an electrohydraulic control valve disposed in fluid communication between a source of pressured fluid and a hydraulic actuator, opening the control valve in response to the pressure command signal to provide a flow of pressurized fluid from the source of pressurized fluid to the hydraulic actuator, the flow of pressurized fluid generating pressure oscillations in the fluid between the control valve and the hydraulic actuator;

sensing a current actuator pressure representative of the pressure of the fluid between the control valve and the hydraulic actuator on multiple occasions;

calculating the pressure difference between the target actuator pressure and the current actuator pressure on multiple occasions as a function of time;

generating an adjustment factor based at least in part upon (i) the calculated pressure difference between the target actuator pressure and the current actuator pressure, (ii) the rate of change in the pressure difference between the target actuator pressure and the current actuator pressure as a function of time, and (iii) the sum of the pressure difference between the target actuator pressure and the current actuator pressure over time;

applying the adjustment factor to the pressure command signal to obtain an adjusted pressure command signal; and applying the adjusted pressure command signal to the control valve to correct for an offset error between the target actuator pressure and the current actuator pressure.

2. The method of claim 1 wherein applying the adjusted pressure command signal to the control valve does not amplify the pressure oscillations generated in the fluid between the control valve and the hydraulic actuator.

3. The method of claim 1 wherein the pressure difference between the target actuator pressure and the current actuator pressure is calculated as a function of time to produce a raw error signal consisting of a series of raw error values, a mean error value is calculated from the series of raw error values, and the adjustment factor is generated from the mean error value.

4. The method of claim 3 wherein the adjustment factor is generated by applying a control algorithm to the calculated mean error value, and wherein the control algorithm includes at least one of a proportional, integral, or derivative term.

5. The method of claim 3 comprising:

storing the series of raw error values in a memory as a function of time, and wherein the mean error value is calculated by:

sequentially evaluating the raw error values in the series of raw error values to identify a peak error value and an adjacent valley error value; and calculating the mean error value by summing the peak error value and the adjacent valley error value to obtain an error value sum and then dividing the error value sum by two.

6. The method of claim 5 wherein the peak error value and the adjacent valley error value are identified by:

calculating a first derivative with respect to time of the raw error values to produce a series of differentiated error values;

comparing each differentiated error value to a previous differentiated error value in the same series to identify:

(i) a first pair of adjacent first and second differentiated error values of opposite sign, wherein the first differentiated error value of the first pair is a positive value, and (ii) a second pair of adjacent third and fourth differentiated error values of opposite sign, wherein the third differentiated error value of the second pair is a negative value;

identifying a first raw error value in the series of raw error values that corresponds to the first differentiated error value and storing the first raw error value as the peak error value; and identifying a second raw error value in the series of raw error values that corresponds to the third differentiated error value and storing the second raw error value as the valley error value.

7. The method of claim 5 wherein the series of raw error values follows a wave pattern that includes a succession of peaks and valleys, and wherein the adjustment factor is generated without the series of raw error values having completed a full cycle of the wave pattern.

8. The method of claim 1 wherein the electric pressure command signal is generated in response to input signals received by an electronic control unit of a vehicle.

9. An electrohydraulic actuation system comprising:

a hydraulic subsystem including an electrohydraulic control valve disposed in fluid communication between a source of pressured fluid and a hydraulic actuator, the control valve controlling a flow and pressure of fluid between the source of pressured fluid and the hydraulic actuator;

a pressure sensor that senses a current actuator pressure representative of the pressure of the fluid between the control valve and the hydraulic actuator;

a target pressure module that determines a target actuator pressure to output from the control valve;

an error module that receives a current actuator pressure signal from the pressure sensor representative of the sensed current actuator pressure as a function of time and a target actuator pressure signal from the target pressure module representative of the target actuator pressure determined by the target pressure module, wherein the error module calculates an adjustment factor based at least in part upon (i) a calculated pressure difference between the target actuator pressure and the current actuator pressure, (ii) a calculated rate of change in the pressure difference between the target actuator pressure and the current actuator pressure as a function of time, and (iii) a sum of the pressure difference between the target actuator pressure and the current actuator pressure over time; and an adjustment module that applies the adjustment factor to the target actuator pressure to generate an adjusted target actuator pressure to output from the control valve, wherein the adjusted target actuator pressure corrects for offset errors between the target actuator pressure and the current actuator pressure, without amplifying pressure oscillations generated in the fluid between the electrohydraulic control valve and the hydraulic actuator.

10. The system of claim 9 comprising: a valve control module that controls opening of the control valve based upon the adjusted target actuator pressure.

11. The system of claim 10 comprising: a solenoid in fluid communication with the control valve, and wherein the valve control module controls opening of the control valve by generating an electric pressure command signal and applying the electric pressure command signal to the solenoid.

12. The system of claim 11 wherein the electric pressure command signal moves the control valve toward an open position, and wherein a biasing member biases the control valve toward a closed position.

13. The system of claim 9 wherein the source of pressured fluid is a pump in fluid communication with a sump, and wherein the pump is mechanically driven by an internal combustion engine or an electric motor.

14. The system of claim 9 wherein the hydraulic actuator comprises a component of an automated manual transmission, dual clutch transmission, continuously variable transmission, automatic transmission, manual transmission, or torque converter.

15. The system of claim 9 wherein the error module:
calculates the pressure difference between the current actuator pressure and the target actuator pressure on multiple occasions as a function of time to produce a series of raw error values;
sequentially evaluates the raw error values to identify a peak error value and an adjacent valley error value in the series of raw error values;
calculates a mean error value from the peak error value and the adjacent valley error value; and
generates the adjustment factor from the mean error value.

16. The system of claim 9 wherein the adjustment factor is generated by applying a control algorithm to the calculated mean error value, and wherein the control algorithm includes at least one of a proportional, integral, or derivative term.

* * * * *